(12) United States Patent
Thomas et al.

(10) Patent No.: US 8,443,045 B2
(45) Date of Patent: May 14, 2013

(54) STORAGE OF SELECTED E-MAILS INCLUDING ATTACHMENTS IN DOCUMENT MANAGEMENT SYSTEM

(75) Inventors: Rob Thomas, Fullerton, CA (US); Pan Kao, La Palma, CA (US); Laura Wise, Hermora Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 10/461,616

(22) Filed: Jun. 13, 2003

(65) Prior Publication Data
US 2004/0064473 A1 Apr. 1, 2004

Related U.S. Application Data

(60) Provisional application No. 60/420,764, filed on Oct. 23, 2002, provisional application No. 60/415,205, filed on Oct. 1, 2002.

(51) Int. Cl.
*G06F 17/30* (2006.01)

(52) U.S. Cl.
USPC .......................................... 709/206; 707/711

(58) Field of Classification Search .................. 707/200, 707/202, 711; 715/752; 709/206
See application file for complete search history.

(56) References Cited

U.S. PATENT DOCUMENTS

| | | | |
|---|---|---|---|
| 4,959,769 A | 9/1990 | Cooper et al. | |
| 5,692,141 A | 11/1997 | Kamisango et al. | |
| 5,754,782 A | 5/1998 | Masada | |
| 5,818,447 A * | 10/1998 | Wolf et al. | 715/752 |
| 5,845,067 A | 12/1998 | Porter et al. | |
| 5,892,909 A | 4/1999 | Grasso et al. | |
| 6,009,442 A | 12/1999 | Chen et al. | |
| 6,128,646 A | 10/2000 | Miloslavsky | |
| 6,182,080 B1 * | 1/2001 | Clements | 707/102 |
| 6,240,429 B1 | 5/2001 | Thornton et al. | |
| 6,253,217 B1 | 6/2001 | Dourish et al. | |
| 6,266,682 B1 | 7/2001 | LaMarca et al. | |
| 6,269,380 B1 | 7/2001 | Terry et al. | |
| 6,308,179 B1 | 10/2001 | Petersen et al. | |

(Continued)

FOREIGN PATENT DOCUMENTS
EP 1063598 * 12/2000

OTHER PUBLICATIONS

Outlook 2000 (Screenshots of Microsoft Outlook 2000 E-Mail Application, copywright 1999.*

(Continued)

*Primary Examiner* — Mahesh Dwivedi
(74) *Attorney, Agent, or Firm* — McDermott Will & Emery LLP

(57) ABSTRACT

A computer-implemented method and system are provided for storing selected e-mails, including the content of the e-mail and attachments, in a document management system. A user initiates storage of the e-mail by a user-actuated control that is added to the interface of his e-mail application. The e-mail is then copied, indexed and stored in a separate document in the document management system, and attachments to the e-mail are embedded in the separate document. The font and graphics of the e-mail may be stored in the separate document as they as they appeared in the original document. The text of the e-mail may be stored in the binary format that is native to a word processor associated with the document management system.

17 Claims, 4 Drawing Sheets

U.S. PATENT DOCUMENTS

| | | | |
|---|---|---|---|
| 6,324,551 B1 | 11/2001 | Lamping et al. | |
| 6,330,573 B1 | 12/2001 | Salisbury et al. | |
| 6,370,538 B1 | 4/2002 | Lamping et al. | |
| 6,370,553 B1 | 4/2002 | Edwards et al. | |
| 6,397,231 B1 | 5/2002 | Salisbury et al. | |
| 6,487,569 B1* | 11/2002 | Lui et al. | 715/530 |
| 6,535,869 B1* | 3/2003 | Housel, III | 1/1 |
| 6,608,138 B2* | 8/2003 | Carignano et al. | 524/755 |
| 6,629,122 B1 | 9/2003 | Yotsukura | 718/101 |
| 6,850,247 B1* | 2/2005 | Reid et al. | 345/611 |
| 7,020,688 B2* | 3/2006 | Sykes, Jr. | 709/206 |
| 7,139,800 B2* | 11/2006 | Bellotti et al. | 709/206 |
| 2001/0047389 A1* | 11/2001 | Prahlad et al. | 709/206 |
| 2002/0046248 A1* | 4/2002 | Drexler | 709/206 |
| 2003/0041112 A1* | 2/2003 | Tada et al. | 709/206 |
| 2003/0135524 A1* | 7/2003 | Cane et al. | 707/204 |
| 2003/0145209 A1* | 7/2003 | Eagle et al. | 713/179 |
| 2003/0233411 A1* | 12/2003 | Parry et al. | 709/206 |
| 2004/0103160 A1* | 5/2004 | Sheldon et al. | 709/206 |
| 2004/0133645 A1* | 7/2004 | Massanelli et al. | 709/206 |

OTHER PUBLICATIONS

Article entitled "Entourage Email Archive (EEA)", by www.softhing.com, dated Apr. 5, 2002.*

Article entitled "Eudora archiver" by www.softobe.com, dated Dec. 25, 2001.*

Imanage (Article entitled Imanage Desksite and Imanage Mailsite dated Jun. 12, 2002).*

Guide (article entitled "Your Guide to Start Using Imanage") dated Nov. 7, 2002.*

Article entitled "Desksite/Mailsite" by Imanage, dated Apr. 4, 2002.*

Article entitled "Past Meetings" by Meetings, dated Jan. 17, 2002.*

Article entitled "IManage Desksite and IManage Mailsite" by Imanage, dated Aug. 10, 2002.*

Article entitled "What's New in Imanage 3.0" by IManage, dated Oct. 13, 2001.*

Article entitled "IManage Mailsite 3.0 Release Notes" by IManage, dated Oct. 13, 2001.*

Article entitled "IManage Client Customization Guide" by IManage, Copyright 2001.*

Message Board post entitled dated Apr. 24, 2000, by Tom's Guide.*

Article entitled "Archived Results from Jan. 1, 1996-latest" by Wayback, Oct. 13, 2001.* iManage Inc. *iManage Client Customization Guide*. 2001 iManage Incorporated, Chicago, IL, pp. 1-138.

iManage Inc. *What's New in iManage MailSite 3.0?* date unknown, iManage Incorporated, Chicago, IL, (4 pages).

iManage. 1999. "IManage Introduces Microsoft Outlook Client for Its IManage Content Management System," Press Release dated Jan. 25, 1999. (Downloaded Sep. 10, 2010 at: http://web.archive.org/web/20010822092251/www.imanage.com/newsevents/pressRelease.asp?id=27).

* cited by examiner

STORAGE OF SELECTED E-MAILS INCLUDING ATTACHMENTS IN DOCUMENT MANAGEMENT SYSTEM

CROSS-REFERENCE TO RELATED APPLICATIONS

The present application is based on and claims priority to U.S. Provisional Application Ser. No. 60/420,764, filed on Oct. 23, 2002, entitled "Storage of Selected E-Mails in Document Management System" by the same inventors of the present application. The present application is also based on and claims priority to U.S. Provisional Application Ser. No. 60/415,205, filed on Oct. 1, 2002, also entitled "Storage of Selected E-Mails in Document Management System," and also by the same inventors of the present application. The content of these provisional applications is incorporated herein by reference.

FIELD OF THE INVENTION

The present invention relates to storage of electronic mail and, more particularly, to storage of selected e-mails in a document management system.

BACKGROUND OF THE INVENTION

As is well known in the art, e-mail communications are often managed by e-mail applications and stored in these applications for later retrieval. Examples of such e-mail applications include MICROSOFT OUTLOOK and LOTUS NOTES.

Documents of other types, e.g., word processing documents, are often separately managed by a document management system ("DMS"), such as IMANAGE™, PC DOCS™ or FILENET™. The word processing documents may be created and edited in a word processing program such as MICROSOFT WORD™ or WORDPERFECT™.

E-mail communications are often received and placed in a user's personal electronic mailbox. Often, a user's personal electronic mailbox is not easily accessible to others, nor is such ease of access desired by the user.

In some cases, the user may wish to make an e-mail and its attachments available to others without making the others privy to the remainder of the user's personal mailbox. In this case, the user might send a single e-mail to all those who need it. Such a task might be time consuming, especially if the user would like to send the message to multiple recipients. Moreover, at a later date, others to whom the e-mail was not sent might have need for the same e-mail and its corresponding attachments. Additional time would need to be spent for additional users to obtain this e-mail and its attachments.

With the vast number of e-mail communications and corresponding attachments received, it is also desirable to organize these e-mails and their attachments in a manner that they can be readily located, by both the original recipient and by others.

Some computer systems attempt to address these problems by allowing e-mails to be stored in a document management system. However, these applications store the e-mail message separate from the attachments and thus do not preserve the relationship between the attachments and the e-mail to which the attachments were associated.

SUMMARY OF THE INVENTION

The invention provides a computer-implemented method, stored program and system, for storing a selected e-mail, including its attachment(s), in a single file in a document management system.

In one embodiment of the invention, a user-actuated control is provided in an e-mail application. When actuated, this control causes the e-mail content and its attachments to be stored in a single file in a document management system.

The e-mail content may be stored in the binary format that is native to the word processor that is associated with the document management system. This separate file may be created by a word processing program that is associated with the document management system. Attachments to the e-mail may be embedded into the separate file along with the e-mail content.

The separate file, including the e-mail and attachments, may be managed by the document management system. The file may use the same font, graphics and other formatting as in the original e-mail. The separate file may be indexed in the document management system. A separate index of the attachments to the e-mail may also be placed within the separate file.

One advantage of the present invention is that it may store a selected e-mail and its attachments in a single document that is managed by a document management system.

Another advantage of the present invention is that it may store the content of the selected e-mail in the same binary format that is native to the word processing program, thus enhancing the operational efficiency of the system.

A still further advantage of the present invention is that it may store the content of the selected e-mail in the same fonts, graphics and other formatting as in the e-mail, thus preserving the integrity of the e-mail.

DETAILED DESCRIPTION OF EXEMPLARY EMBODIMENTS

The present invention can be applied to various e-mail applications, such as LOTUS NOTEST™ and MICROSOFT™ OUTLOOK™, to store selected e-mails and embedding their attachments into a separate document managed by a document management system, such as PC DOCS™, IMANAGE™, or FILENET™.

The present invention can be carried out using a computer with an e-mail application, such as LOTUS NOTEST™ or MICROSOFT OUTLOOK™. The computer may be a personal computer or any other type of computer. It may be a stand alone system or a networked system.

Figure 1:
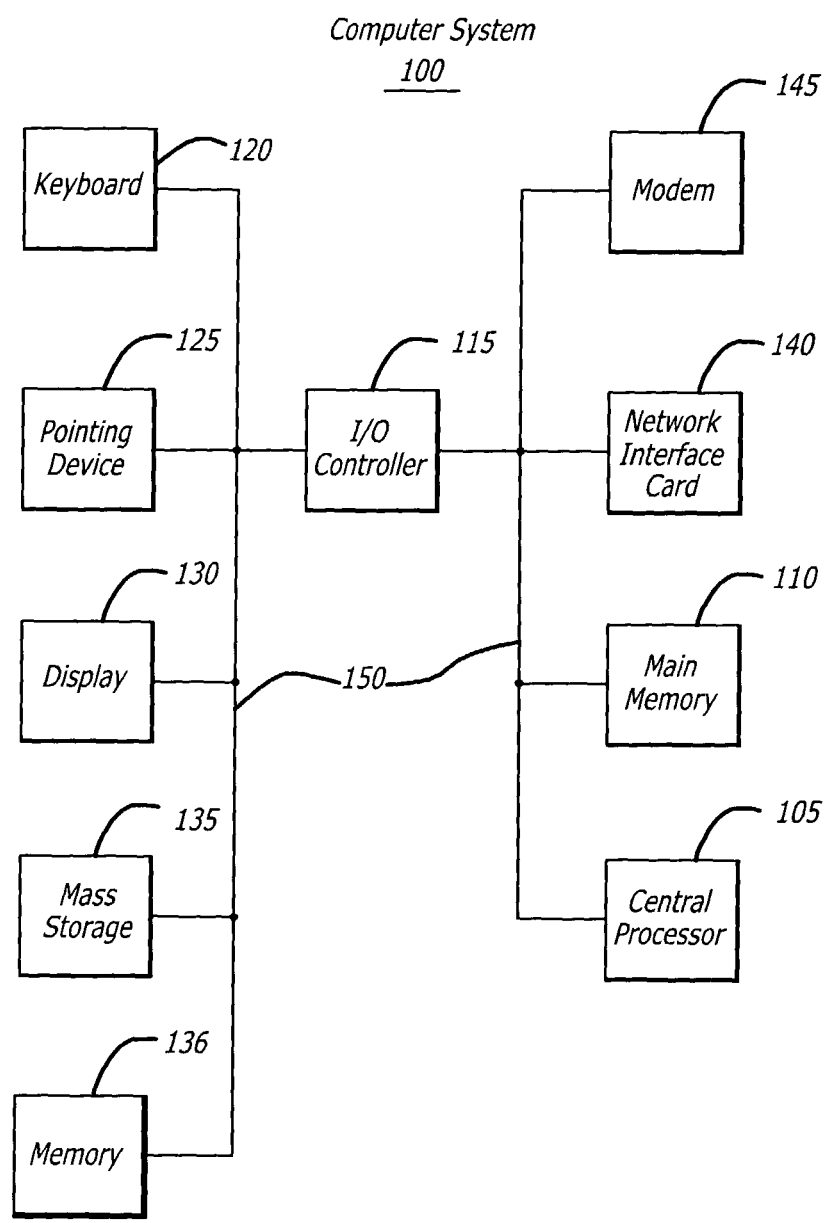
FIG. 1 is a computer system embodying one embodiment of the present invention.

A typical computer that implements the invention is shown as system 100 in FIG. 1. The system 100 may include a central processor 105, a main memory 110, an input/output controller 115, a keyboard 120, a pointing device 125 such as a mouse, track ball, pen device or the like, a display or screen device 130, a mass storage device 135, such as a hard disk, removable floppy disk, optical disk, magneto-optical disk or flash memory, a memory 136, a network interface card or controller 140, and a modem 145. The system 100 may communicate with other systems through a system bus 110, a network interface card 140, a modem 145, or the like, or through a combination of these sub-systems.

Figure 2:
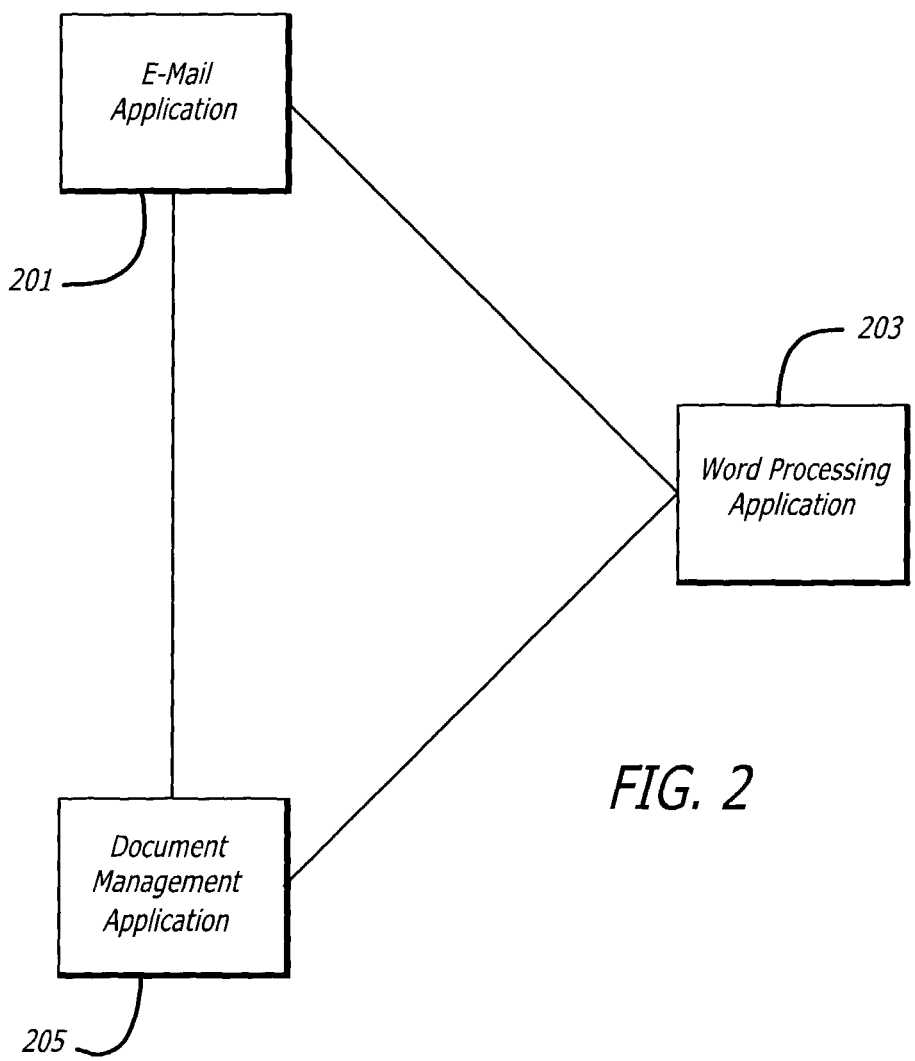
FIG. 2 is a block diagram of certain software in a computer system.

As reflected in FIG. 2, the system 100 may include several software applications, such as a document management system 205, an e-mail application 201, and a word processing application 203. The keyboard 120 and/or pointing device 125 may be used for inputting necessary information to these applications and for controlling them, all as is well known.

Figure 3:
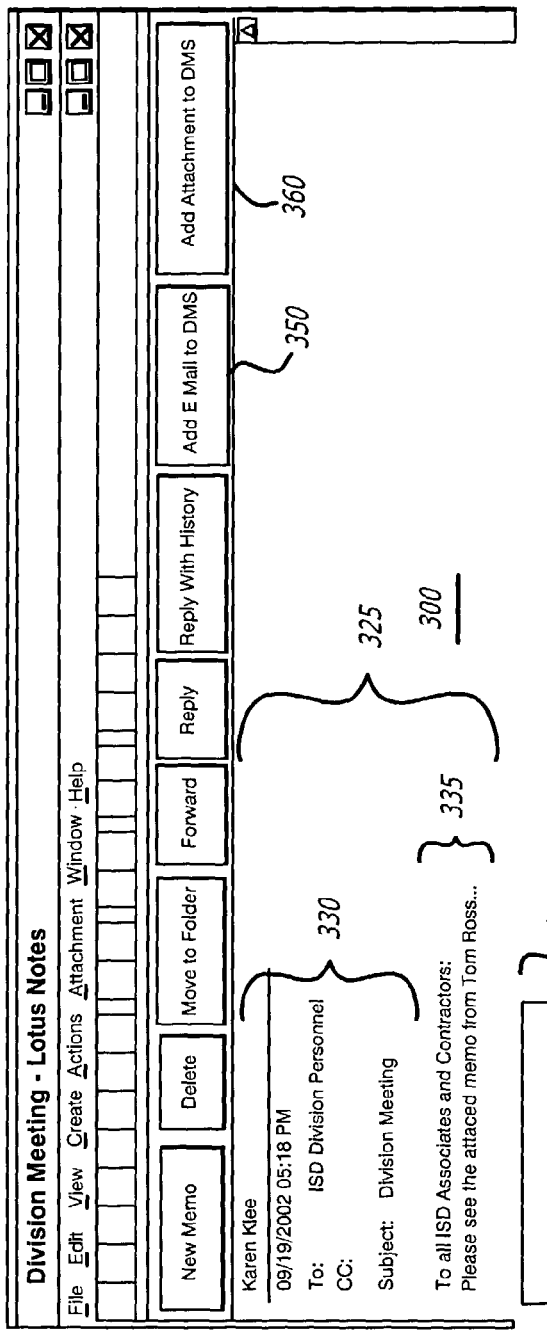
FIG. 3 is a screen showing the user interface to e-mail application that is displaying an e-mail, its attachment, and various user controls configured in accordance with one embodiment of the invention.

FIG. 3 is a screen showing the user interface to e-mail application that is displaying an e-mail, its attachment, and various user controls configured in accordance with one embodiment of the invention. As shown in FIG. 3, a window 300 displays e-mail content, including a header 330 and text 335. Graphics and other elements could also be part of the e-mail content 325, as is well known.

The window 300 also shows an icon 340 representing an attachment to the e-mail, as is also well known. Although only one attachment is shown, it is to be understood that there could be several attachments, in which case each would typically be shown as a separate icon.

The screen in FIG. 3 also includes two user-actuated controls, an "Add E-Mail to DMS" button 350 and an "Add Attachment to DMS" button 360. Although not shown, the screen could also include an "Add E-Mail Message Only" button, as will later be described.

The "Add E-Mail to DMS" button 350 may be associated using well known programming techniques with a software routine that is actuated upon activation of the button. One such technique is to associate the button with a macro that is managed by the word processing application 203.

Upon actuation of the "Add E-Mail to DMS" button, the macro may copy the e-mail content and any attachments to it into a new container, such as a new word processing document. The content could include the text and header, as well as any other information that is within the e-mail. The fonts and other formatted aspects of the e-mail content may be fully preserved during this process.

The new container may also be created in the binary format that is native to the word processing program or it may be created in another format.

The attachments might be illustrated in the new container as icons, just like they are illustrated in the original e-mail. If there are many attachments to the e-mail, the macro might also create an index of the attachments and embed that index into the new container. The index might consists of the file names of the attachments.

Figure 4:
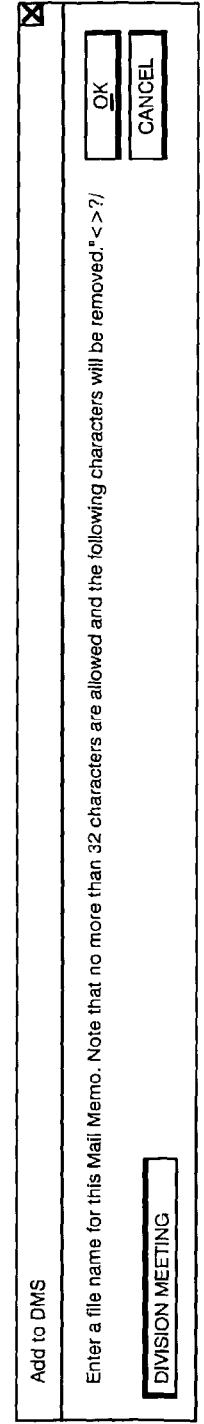
FIG. 4 is a dialog box for receiving a name for the separate document created by one embodiment of the invention.

Once the container is created and filled with the e-mail content and attachments, a dialog box might be presented to the user, asking the user for a name for the new container, as reflected in FIG. 4. The dialog box might propose a default name for the user's acceptance, such as the name in the "Subject" section of the e-mail content. This is also reflected in FIG. 4. (It proposes "Division Meeting" which is the name in the "Subject" section in the e-mail content, as shown in FIG. 2.)

Figure 5:
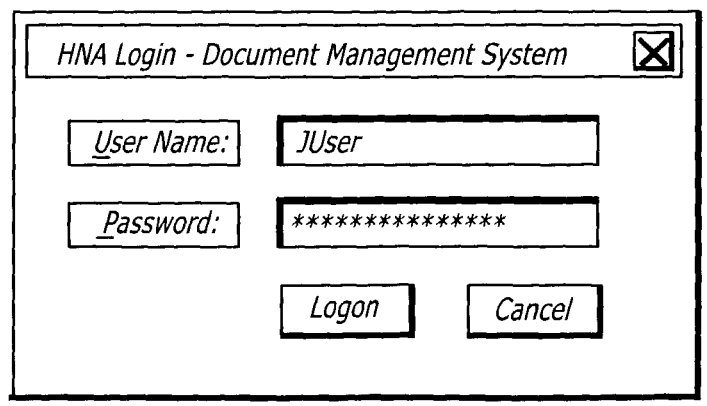
FIG. 5 is a dialog box for indexing the separate document created by one embodiment of the invention into a document management system.

The macro might next check to see if the user has already logged onto the document management system. If not, it might activate the log-on screen of the document management system, as shown in FIG. 5 The user might then log in, e.g., by entering his user name and password and clicking the "Logon" button.

Figure 6:
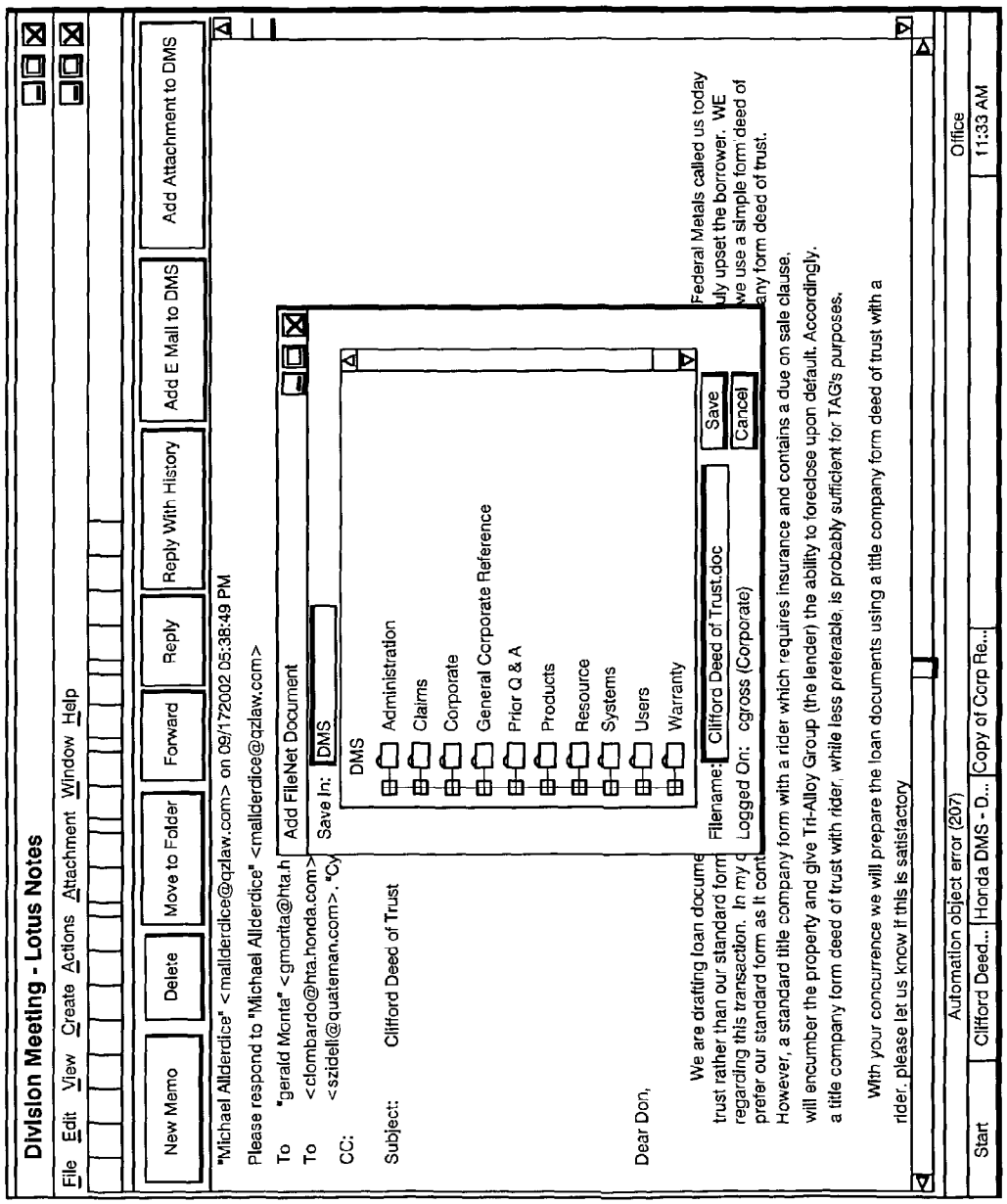
FIG. 6 illustrates an indexing dialog box that may be used to index the new container in the document management system.

The macro might then activate the indexing system of the document management system, so as to allow the new container to be indexed in the document management system. FIG. 6 illustrates an indexing dialog box that might be shown. As shown in FIG. 6, the user may be presented with a selection of folders into which the user can place the container. The user may then cause the container to be stored in the document management system by completing a document attribute screen. In other document management systems, a fuller set of indexing fields might be presented, all as is well known.

Instead of activating the "Add E-Mail to DMS" button 350, the user might instead activate the "Add Attachment to DMS" button 360. This would function in a similar way to button 350, except that the system would only store the attachments in the container, without the e-mail content. In one embodiment, the system might offer to store each attachment in a separate container, with a separate name and separate indexing in the document management system. The system could also allow the user to select which of the attachments the user wishes to store in the document management system.

The software needed to implement the invention might be stored on a computer-readable medium, such as a CD ROM or hard drive. The software that is stored on the media might merely be that amount of software that is needed to add to an existing computer system that already has an e-mail application, document management application and a word processing application. In this event, the software might merely consist of a macro for the word processing program and, perhaps, related software that loads the macro, a user-actuated control in the e-mail application, and a map between the two.

Although not shown, a third button could also be provided that, when activated, would store only the e-mail content into the container, without attachments.

In the alternative, only a single button or other user-actuated control could be provided that, once actuated, allows the user to later select whether the user wants to store the e-mail content and its attachments in a single container, in separate containers, or to store only the e-mail content or attachments in a container.

Although buttons have thus-far been described as performing certain functions, it is to be understood that other user-operated controls could be used instead or in addition, such as menu entries or keyboard shortcuts.

Although reference has thus-far been made to copying and embedding the attachments into the separate container, it is to be understood that the concept of embedding has been intended in its logical sense, not its physical sense. Thus, although the attachments could physically be stored in the container, they could also be stored in separate files with links to them being embedded in the container. The container itself could be a single file or multiple files managed under a single name.

Although reference has been made to a word processing program being associated with the document management system, it is to be understood that other types of document processing applications could be used instead or in addition, such as a presentation application (e.g., Power Point), a spread sheet application (e.g., Excel), or a graphics application (e.g., Visio). In each case, the format of the container into which the e-mail content and/or attachments are copied may be native to the application that is contemplated to be used with the container, with appropriate indexing being done in the document management system. In some situations, there might be several applications that could manage the container. In this situation, the user might be given the choice at an appropriate moment as to which application to use as the native application for the container and document management system.

The present invention has been described with reference to certain exemplary embodiments. However, it will be readily apparent to those skilled in the art that it is possible to embody the invention in forms other than these embodiment. This may be done without departing from the spirit of the invention. The embodiments are merely illustrative and should not be considered restrictive in any way. The scope of the invention is given by the appended claims, rather than the preceding description, and all variations and equivalents that fall within the range of the claims are intended to be embraced.

What is claimed is:

1. A computer readable media containing a computer program that causes a computer system loaded with that program and other software to implement the following process in connection with a selected received e-mail having content and an attachment in the order recited:
    receiving e-mails in an email application and placing them in a user's personal electronic mailbox;
    receiving a user-selection of a received e-mail in the user's personal electronic mailbox having content and an attachment;
    providing a user-actuated control in an e-mail application;
    receiving information indicating that the user-actuated control in a user interface to the e-mail application has been activated while the received e-mail is selected;
    in response to the receiving, copying the content and the attachment into a single, new container that is separate from the user's personal electronic mailbox, the single, new container containing both the content and the attachment in a binary format native to a word processing program with the attachment being illustrated in the single, new container as an icon; and
    indexing and storing the single container in a document management system that is associated with and separate from the word processing program and that allows a user to associate documents with multiple classification categories and that is separate from any word processing application that may be associated with the document management system and from the user's personal electronic mailbox, including presenting an indexing dialog box to the user providing a set of indexing fields for the user to select that allow the user to associate the single container with multiple classification categories and indexing the container in the document management system according to the choices that the user selects.

2. The media of claim 1 wherein the program further causes the copying to be performed under the control of a macro that is run in the word processing application.

3. The media of claim 1 wherein the program further causes the user-actuated control to be a button.

4. The media of claim 1 wherein the content of the selected e-mail is formatted and the program further causes the content to be copied into the container with the same formatting.

5. The media of claim 1 wherein the selected e-mail includes a plurality of attachments and wherein the program further causes creating an index of the attachments and embedding that index in the container along with the content of the email and the plurality of attachments.

6. The media of claim 1 wherein the program further copies the content and attachment from an email that has been received by the user.

7. The computer-readable media of claim 1 wherein the container into which the content and attachment are copied that is separate from the user's personal mailbox is a single file.

8. The computer-readable media of claim 7 wherein the selected e-mail includes a plurality of attachments and wherein the program further causes creating an index of the attachments and embedding that index in the single file along with the content of the email and the plurality of attachments.

9. A computer system for storing the content of a selected received e-mail along with an attachment to the selected e-mail comprising mass storage containing:
    an e-mail application having a user's personal electronic mailbox;
    a document management application;
    a word processing application that is associated with and separate from the document management application; and
    a software routine that implements the following process when loaded in the order recited:
        receiving e-mails in the email application and placing them in the user's personal electronic mailbox;
        receiving a user-selection of a received e-mail in the user's personal electronic mailbox having content and an attachment;
        providing-a user-actuated control in the e-mail application;
        receiving information indicating that the user-actuated control in a user interface to the e-mail application has been activated while the received e-mail is selected;
        in response to the receiving, copying the content and the attachment into a single, new container that is separate from the user's personal electronic mailbox, the single, new container containing both the content and the attachment in a binary format native to the word processing program with the attachment being illustrated in the single, new container as an icon; and
        indexing and storing the single container in the-document management system that allows a user to associate documents with multiple classification categories and that is separate from the word processing application and from the user's personal electronic mailbox, including presenting an indexing dialog box to the user providing a set of indexing fields for the user to select that allow the user to associate the single container with multiple classification categories and indexing the container in the document management system according to the choices that the user selects.

10. The computer system of claim 9 wherein the software routine when loaded further causes the copying to be performed under the control of a macro that is run in the word processing.

11. The computer system of claim 9 wherein the software routine when loaded further causes the user-actuated control to be a button.

12. The computer system of claim 9 wherein the software routine when loaded further causes the content of the selected e-mail to be copied in the container in the same format as it is in the selected e-mail.

13. The computer system of claim 9 wherein the selected e-mail has a plurality of attachments and wherein the software routine when loaded further causes creating an index of the attachments and embedding that index in the container along with the content and the plurality of attachments.

14. The computer system of claim 9 wherein the software routine also copies the content and attachment from an email that has been received by the user.

15. The computer system of claim 9 wherein the container into which the content and attachment are copied that is separate from the user's personal mailbox is a single file.

16. The computer system of claim 15 wherein the selected e-mail has a plurality of attachments and wherein the software routine when loaded further causes creating an index of the attachments and embedding that index in the single file along with the content and the plurality of attachments.

17. The computer system of claim 16 wherein the software routine when loaded further causes the copying to be performed under the control of a macro that is run in the word processing application.

* * * * *